United States Patent [19]

Weber et al.

[11] Patent Number: 4,941,440
[45] Date of Patent: Jul. 17, 1990

[54] ENGINE INCLUDING A PISTON MEMBER HAVING A HIGH TOP RING GROOVE

[75] Inventors: Robert L. Weber, Lacon; Kenneth R. Kamman, Edelstein; Benny Ballheimer; Stephen G. Shoup, both of Peoria, all of Ill.

[73] Assignee: Caterpillar Inc., Peoria, Ill.

[21] Appl. No.: 391,647

[22] Filed: Aug. 7, 1989

Related U.S. Application Data

[63] Continuation of Ser. No. 261,664, Oct. 21, 1988, abandoned.

[51] Int. Cl.$^5$ ................................................ F02F 3/00
[52] U.S. Cl. ............................... 123/193 P; 123/41.83
[58] Field of Search ............... 123/41.83, 41.84, 193 P

[56] References Cited

U.S. PATENT DOCUMENTS

| | | | |
|---|---|---|---|
| 2,296,478 | 9/1942 | Morgan | 92/159 |
| 2,308,178 | 1/1943 | Kishline | 92/159 |
| 2,407,429 | 9/1946 | Kuttner | 92/158 |
| 3,971,355 | 7/1976 | Kottmann | 123/197 |
| 4,056,044 | 11/1977 | Kamman et al. | 92/159 |
| 4,129,108 | 12/1978 | Elsbett et al. | 123/193 P |
| 4,180,027 | 12/1979 | Taylor | 123/41.35 |
| 4,207,808 | 6/1980 | Elsbett et al. | 92/158 |
| 4,270,494 | 6/1981 | Garter et al. | 123/193 P |
| 4,286,505 | 9/1981 | Amdall | 92/186 |
| 4,377,967 | 3/1983 | Pelizzoni | 92/186 |
| 4,577,595 | 3/1986 | Deutschmann et al. | 123/41.35 |
| 4,581,983 | 4/1986 | Moebus | 92/186 |
| 4,638,769 | 1/1987 | Ballheimer | 123/41.84 |
| 4,644,853 | 2/1987 | Russell et al. | 92/190 |
| 4,662,047 | 5/1987 | Berchem | 29/156.5 |
| 4,704,950 | 11/1987 | Ripberger et al. | 92/208 |
| 4,781,159 | 11/1988 | Elsbett et al. | 123/193 P |
| 4,805,518 | 2/1989 | Heban, Jr. | 123/193 P |

FOREIGN PATENT DOCUMENTS 0106935 5/1984 European Pat. Off. .
4793779 4/1979 Japan .

OTHER PUBLICATIONS

Technical Paper; Mahle Symposium (pp. 3; 77-89) dated May, 1973, by H. G. Braendel.
Technical Paper; Associated Engrg. Group Technical Symposium, Paper No. 7 Title: "Oil Cooled & Electron Beam Welded Pistons for Diesel Engs.", dated 1978, by Dr. R. Monro, et al.
Technical Paper No. 780781; Society of Automotive Engineers, dated Sep. 11-14, 1978, by M. D. Roehrle.
Technical Paper No. 770031; Society of Automotive Engineers, dated Feb. 28-Mar. 4, 1977, by M. D. Roehrle.
Application filed simultaneously herewith by: Bruce C. Cooper et al. for: Engine Piston Assembly and Piston Member Therefor Having a Cooling Recess.
Application filed simultaneously herewith by: B. Ballheimer et al. for: Piston Assembly and Piston Member Thereof Having a Predetermined Compression Height to Diameter Ratio.

*Primary Examiner*—E. Rollins Cross
*Attorney, Agent, or Firm*—Charles E. Lanchantin, Jr.

[57] ABSTRACT

Present day diesel engines having aluminum piston assemblies are limited to combustion chamber pressures of approximately 12,410 kPa (1,800 psi) whereas the desire is to increase such pressures up to the 15,170 kPa (2,200 psi) range. To reach such levels the instant engine has a piston assembly including a steel piston member having an upper cylindrical portion of a diameter D and defining a top surface, a depending tubular wall having a top ring groove a minimal elevational distance TRH below the top surface, and an annular cooling recess located beneath the top surface and juxtaposed to the top ring groove for removing heat away therefrom in use. The piston member is preferably forged and subsequently machined to precisely controllable dimensions, and has a ratio of TRH to D of less than 0.06. Moreover, the piston assembly is preferably of the articulated type and includes a forged aluminum piston skirt connected to the piston member through a common wrist pin. The skirt has an upwardly facing oil trough that is disposed in a cooperating relationship with the cooling recess of the piston member. A midsupported cylinder liner surrounds the piston assembly and a recess is provided thereabout at an elevation aligned with the top ring groove for maximizing cooling.

10 Claims, 3 Drawing Sheets

ENGINE INCLUDING A PISTON MEMBER HAVING A HIGH TOP RING GROOVE

DESCRIPTION

This is a continuation of Ser. No. 261,664, filed Oct. 21, 1988, now abandoned.

1. Technical Field

This invention relates generally to a high output internal combustion engine including a compact engine piston assembly, and more particularly to a piston assembly including a steel piston member with a high to ring groove capable of resisting relatively high combustion chamber pressures and temperatures and to the cooling thereof.

2. Background Art

The last several years has seen an increasing amount of emphasis on designing engines more compactly and yet with improved fuel economy and efficiency, reduced emissions, a greater service life, and an increased power output per cylinder. As present day engines are converted or upgraded, the piston assembly is subjected to ever-higher combustion chamber pressures and temperatures. Present day aluminum piston assemblies, for example, are generally limited to combustion chamber pressures of no more than about 12,410 kPa (1,800 psi).

The cooled composite piston assemblies disclosed in U.S. Pat. No. 4,581,983 issued to H. Moebus on Apr. 15, 1986 and in U.S. Pat. No. 4,286,505 issued to J. K. Amdall are illustrative of two configurations that can withstand such increased power levels. However, the upper and lower parts thereof are joined together by welding, and this is a costly process that preferably is to be avoided.

A more desirable type of piston assembly is disclosed in U.S. Pat. No. 4,056,044 issued to K. R. Kamman on Nov. 1, 1977. The Kamman patent, which is assigned to the Assignee of the present invention, teaches the use of an articulated piston assembly having an upper piston member and a lower floating skirt which are individually pivotally connected to a common wrist pin. Extensive testing thereof has indicated that the practical level of knowledge on casting procedures is insufficient to resist combustion pressures above about 13,790 kPa (2,000 psi). Specifically, an excessive number of the upper cast steel piston members had so much porosity that premature failure resulted in experimental tests. On the other hand, a few cast steel piston members were manufactured with relatively low levels of porosity so that they survived a relatively rigorous testing program. While extensive studies were conducted to minimize porosity levels in the cast members, from a practical standpoint the levels remain too high. Accordingly, for quality control purposes it has been found necessary to X-ray each piston member thoroughly, and this is simply too costly to do.

In addition to porosity considerations, it should be appreciated that the structural shape and strength of each element of an articulated piston assembly is in a continual stage of being modified to better resist higher compressive loads and thermally induced forces. For example, Society of Automotive Engineers Inc. Paper No. 770031 authored by M. D. Roehrle, entitled "Pistons for High Output Diesel Engines", and presented circa Feb. 28, 1977, is indicative of the great number of laboratory tests conducted throughout the world on the individual elements. That paper also discusses a number of considerations to minimize cracking problems in light alloy or aluminum piston members resulting primarily from thermal constraints. One consideration involves the desirability of increasing the distance between the upper edge of the wrist pin bore to the underside of the crown to reduce stresses in the pin bore region. However, in marked contradiction, it is becoming more important to reduce the so-called critical height CH of the piston member, which is defined by the elevational distance between the top surface thereof and the central axis of the wrist pin, in order to provide increased compactness and to lower overall costs.

An additional problem is to provide a relatively high top compression ring in order to minimize the crevice volume above that ring to the top of the piston member. If the crevice volume is large there is a substantial quantity of combustion gases that are not properly burned because the material is entrapped in a dead space between the piston member and the cylinder bore. This contributes substantially to combustion inefficiency. But when the top ring is elevated there is an increasing need to continually cool the annular region immediately around it in order to better remove the increased heat experienced thereat. U.S. Pat. No. 4,056,044 noted above illustrates a top ring located an excessive distance from the top surface of the piston member, and a piston skirt which has an annular groove or trough at the upper surface thereof. Oil directed to the trough is advantageously splash lubricated against the underside of the crown surface and to that region. Also, while water or the like is simultaneously circulated about the cylinder liner in that embodiment, the liner recess does not extend upwardly enough to sufficiently cool the top region of the liner.

Thus, what is needed is a high output engine and piston assembly including a piston member therefor which has a minimal crevice volume and is capable of continuous and efficient operation at combustion chamber pressures above about 13,790 kPa (2,000 psi), and preferably in the region of about 15,170 kPa (2,200 psi). Furthermore, the piston member should be of a steel material and should be relatively easy to manufacture by having a configuration substantially devoid of complex shapes to allow the forging thereof. Moreover, the upper portion of the piston member should preferably be as smooth and symmetrical as possible to avoid stress risers and/or differential thermal distortion thereof, and be constructed for maximum cooling of the underside surfaces thereof. And, the engine must provide sufficient cooling exteriorly of the cylinder liner to maximize the effective cooling of the upper portion of the piston member in the region of the top ring groove. And still further, the compressive height CH of the piston member should preferably be as small as practical for maximizing compactness of the piston assembly.

The present invention is directed to overcoming one or more of the problems as set forth above.

DISCLOSURE OF THE INVENTION

In one aspect of the present invention, an engine includes a block defining an upper bore, a cylinder liner received in the block bore and defining a piston bore, a cylinder head connected to the block, and a piston assembly including a steel piston member disposed for reciprocation in the piston bore. The steel piston member has an upper portion of a preselected diameter D, a peripheral top surface, a recessed crown surface, a tubular wall defining a top land, a top ring groove located a minimal distance TRH from the top surface, and wherein the ration TRH/D is less than 0.06, a lower end surface, and a radially inwardly facing surface extending upwardly therefrom. The upper portion also includes a radially outwardly facing surface and a transition portion connected thereto and to the radially inwardly facing portion to collectively define a cooling recess located in elevationally juxtaposed relation to the top ring groove. A lower portion of the steel piston member includes a pair of pin bosses blendingly associated with the recess and individually having a bore therein. Moreover, an annular recess is defined between the cylinder liner and the block that, in use, permits a cooling liquid to be circulated therethrough in elevationally aligned relation with the top ring groove to dissipate heat away from the piston member thereat.

More specifically, the upper portion of the steel piston member of the present invention has surfaces of revolution about a central axis so as to minimize distortion thereof in use, a non-complex shape so that is can conveniently be forged and machined, and a cross sectional configuration that is lightweight and yet is capable of resisting combustion chamber pressures in a range in excess of 13,790 kPa (2,000 psi).

BEST MODE FOR CARRYING OUT THE INVENTION

Figure 1:
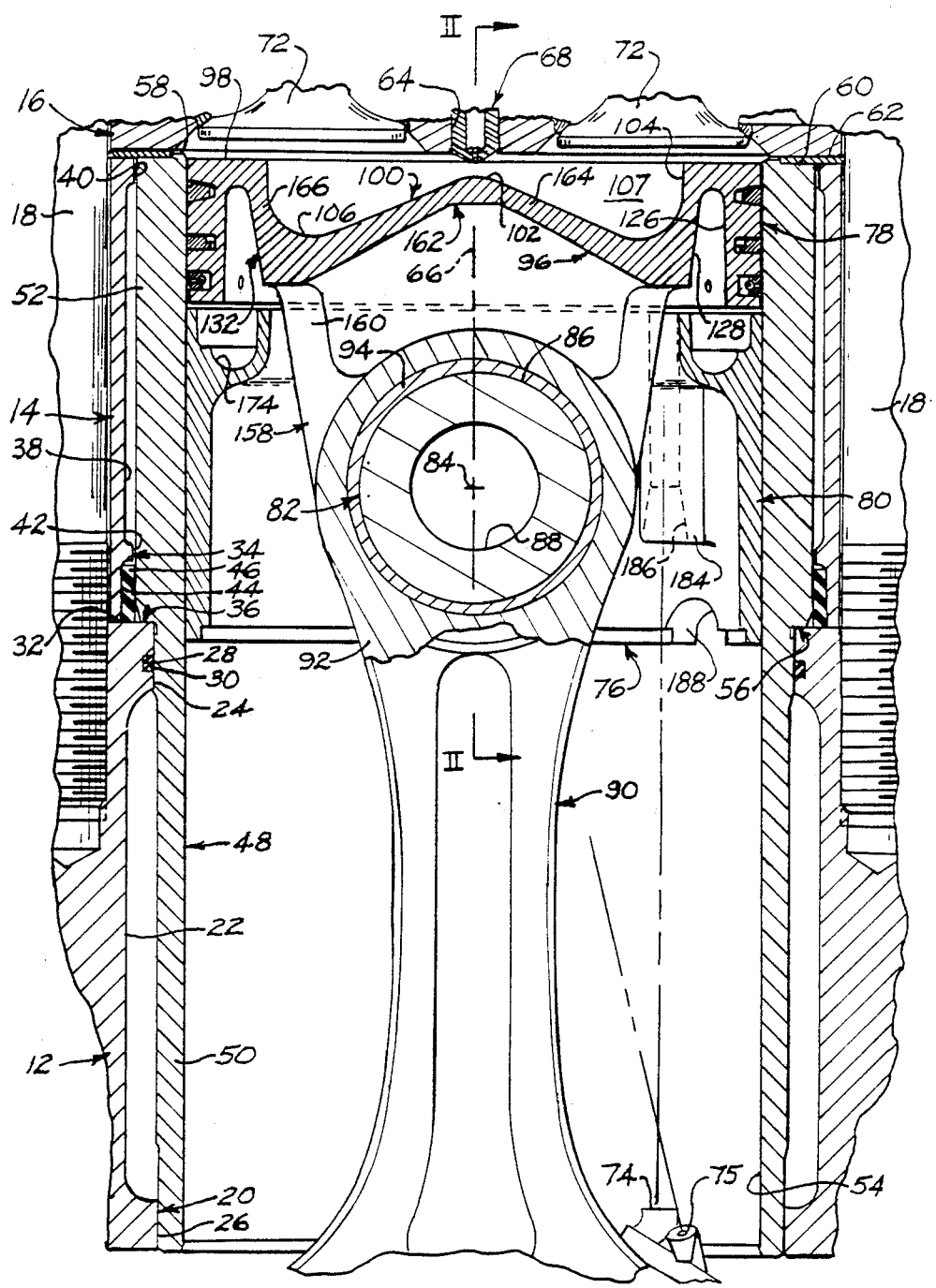
FIG. 1 is a diagrammatic, fragmentary, transverse vertical sectional view of an engine including an engine block, cylinder liner, and piston assembly constructed in accordance with the present invention.
Figure 2:
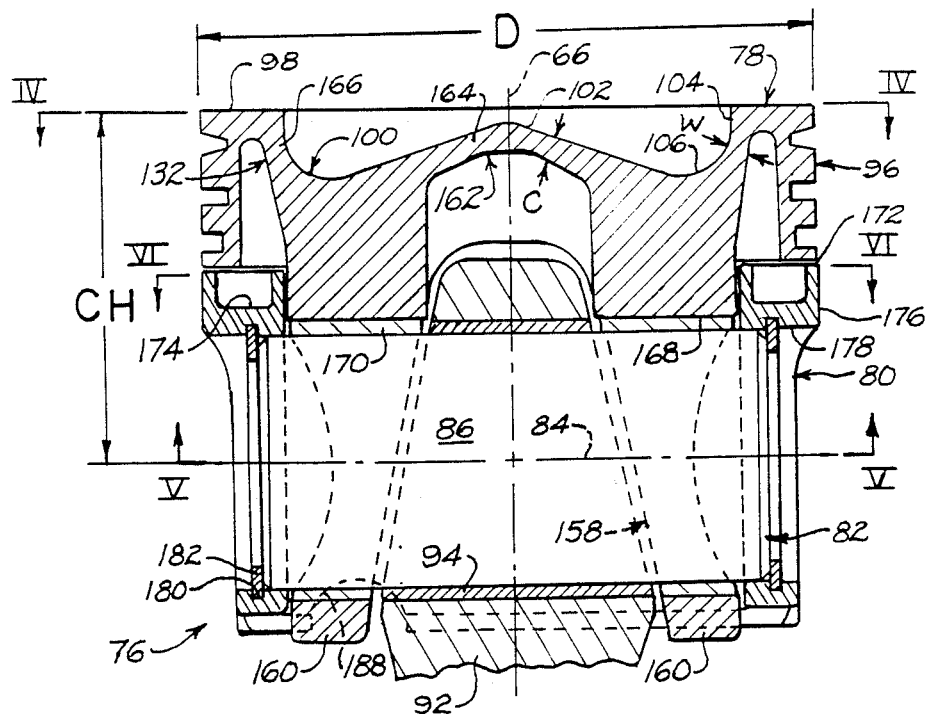
FIG. 2 is longitudinal vertical sectional view of a portion of the piston assembly illustrated in FIG. 1 as taken along the line II—II thereof.

Referring now to FIGS. 1 and 2, a high output diesel engine 10 of the multi-cylinder type includes a bottom block 12, a top block or spacer portion 14, and a cylinder head 16 rigidly secured together in the usual way by a plurality of fasteners or bolts 18 which pass through the head and top block and are screwthreadably received in the bottom block. The bottom block has a generally cylindrical opening 20 therethrough and an annular recess 22 communicating centrally with the opening so as to define a top land 24 and a bottom land 26. In this example the top land is of slightly larger diameter than the bottom land. An annular groove 28 can optionally be provided in the top land to receive an elastomeric seal ring 30 as is illustrated.

The top block 14 is seated on a top surface 32 of the bottom block 12 and has a bore 34 of a larger diameter than the bottom block bore 20 so as to define an upwardly facing annular seat 36 thereat. The top block also has an annular recess 38 that opens on the bore 34 and thereby defines a top land 40 and a bottom land 42. An annular recess 44 is also defined in the bottom land 42 so as to receive an elastomeric sleeve type seal ring 46 which, in use, sealingly engages the top surface 32 of the bottom block.

A midsupported cylinder liner 48 has a stepped cylindrical lower portion 50 which extends into, and is preferably stabilizingly supported by the top and bottom lands 24 and 26 of the bottom block 12. The liner also has a cylindrical upper portion 52 which extends relatively loosely through the top and bottom lands 40 and 42 of the top block 14. The liner defines a piston bore 54 therethrough and is of greater radial thickness at the upper portion than the lower portion so as to define a downwardly facing seat or annular support surface 56 that, in use, engages against the upwardly facing seat 36 of the bottom block. The seal ring 30 sealingly engages against the lower portion, while the seal ring 46 sealingly engages against the upper portion at elevationally spaced positions at either side of the interface between the bottom and top blocks.

A top surface 58 and a radially outwardly extending annular recess 60 are defined by the upper end of the liner 48 so as to receive a conventional compressible head gasket 62. The head gasket is sealingly entrapped between the upper surface of the top block 14 and the bottom surface of the cylinder head 16, and between the liner recess 60 and the bottom surface of the cylinder head. In this embodiment the cylinder head directly engages the head gasket when the fasteners 18 are screwthreadably engaged in the bottom block 12 so as to positively bias the support surface 56 of the liner against the seat 36 of the bottom block. In this regard, cross reference is made to U.S. Pat. No. 4,638,769 issued to B. Ballheimer on Jan. 27, 1987 which further discusses the features and advantages of the midsupported cylinder liner disclosed herein.

The cylinder head 16 of the diesel engine 10 includes an upright opening 64 therethrough which, in the instant embodiment, is generally axially aligned with an upright central axis 66 of the cylindrical liner bore 54. A fuel injection nozzle 68 is received in that opening. Moreover, a plurality of valve openings or ports 70, two of which are diagrammatically shown in FIG. 1 at positions slightly rotated away from their true positions for illustrative convenience and two of which are not illustrated, are adapted to receive a corresponding number of reciprocatable engine valves 72 in a well-known manner.

The diesel engine 10 further includes first and second nozzles 74 and 75 as is shown in the lower right portion of FIG. 1. The first nozzle 74 is rigidly secured to the bottom block 12 and is operationally associated with a conventional source of pressurized oil, not shown, to supply a narrow jet thereof substantially vertically against a preselected region of an articulated piston assembly 76. The second nozzle 75 is also secured to the bottom block, but is angularly inclined away from the vertical to impinge on another region of the piston assembly as it reciprocates.

The piston assembly 76 of the diesel engine 10 includes an upper steel piston member 78 and a lower aluminum piston skirt 80 which are rockably mounted on a common wrist pin or gudgeon pin 82 having a longitudinally oriented central axis 84. The wrist pin is also of steel material and has an external cylindrical surface 86, and a cylindrical bore 88 therethrough for weight reduction purposes. A conventional connecting rod 90 having an upper eye end 92 and a steel-backed bronze sleeve bearing 94 therein is operationally connected to, and driven by the wrist pin.

Figure 4:
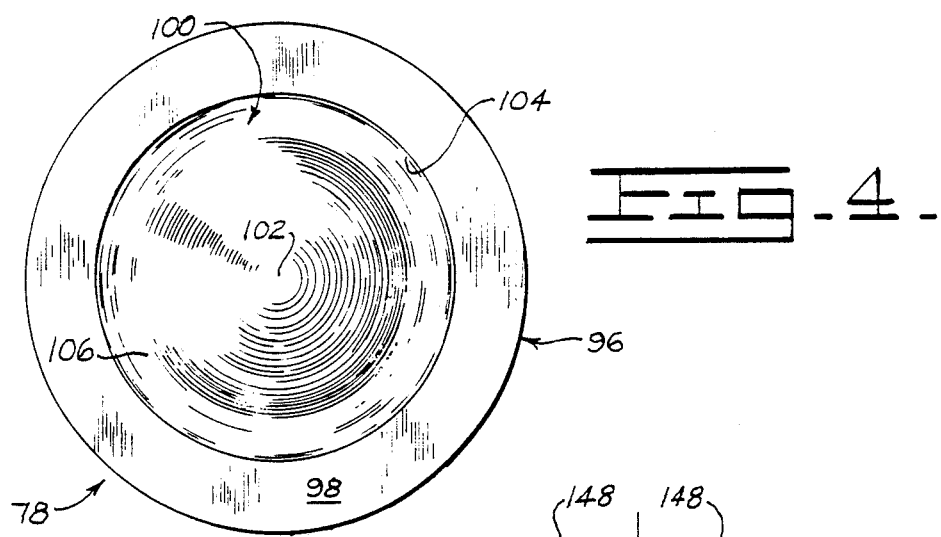
FIG. 4 is a top view of the piston member shown in FIG. 2 as taken along line IV—IV thereof.

As is shown in FIGS. 2 and 4, the steel piston member 78 has an upper portion 96 of substantially cylindrical shape and a preselected maximum diameter D as is illustrated. The upper portion 96 has a peripheral top surface 98 that is flat, or is located on a plane perpendicular to the central axis 66, and a crown surface 100 that in the instant example is desirably defined by fully machined surfaces of revolution about the central axis 66. In general, the crown surface has a centrally located apex portion 102 elevationally disposed below the top surface, a peripheral or radially outer land portion 104 that is substantially cylindrical in order to improve combustion turbulence, and an annular trough 106 that smoothly blends with the apex and outer land portions. This combination of surfaces greatly improves combustion efficiency. As can be appreciated by reference to FIG. 1, the circular region located immediately above the crown surface 100 and the peripheral top surface 98 of the piston member, and below the cylinder head 16 when the piston assembly 76 is disposed at top dead center is known as a combustion chamber 107, and the total geometric volume thereof is known as the clearance volume.

Figure 3:
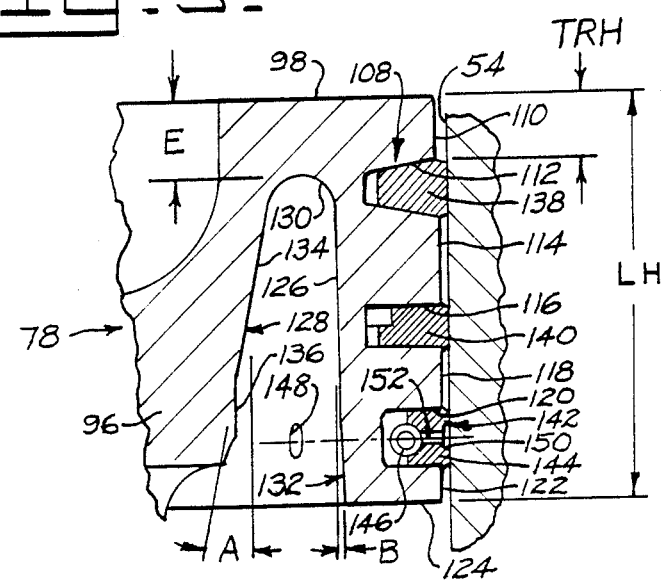
FIG. 3 is an enlarged fragmentary portion of the top peripheral region of the piston member shown in FIGS. 1 and 2 to better show details of construction thereof.

As is shown best in FIG. 3, the piston member 78 further includes a tubular wall 108 that depends from the outer edge of the top surface 98 and defines in serially depending order fully around the periphery thereof a first or top land 110, a top ring groove 112 having a keystone or wedge-like shape in cross section, a second or upper intermediate land 114, an intermediate ring groove 116 of rectangular cross section, a third or lower intermediate land 118, a bottom ring groove 120 of rectangular cross section, and a fourth or bottom land 122 that is terminated by a lower end surface 124. An annular radially inwardly facing wall surface 126 is also delineated by the wall 108 and extends upwardly from the end surface 124. The upper portion 96 of the piston member is additionally defined by an annular radially outwardly facing wall surface 128 and a downwardly facing transition portion 130 that is blendingly associated with the wall surfaces 126 and 128 to collectively define an annular cooling recess 132 of a precise cross sectional shape. In actuality, the wall surface 128 of the instant example includes an upper fully-conical portion 134 having an inclination angle A with respect to the central axis 66 of approximately 12.33 degrees as is shown in FIG. 3, and a fully-cylindrical portion 136 below it. Whereas the wall surface 126 is solely fully-conical and has an inclination angle B of approximately 1.17 degrees. The recess surfaces 126, 130, 134 and 136 are also preferably fully machined surfaces of revolution about the axis 66 for precise dimensional control.

Figure 5:
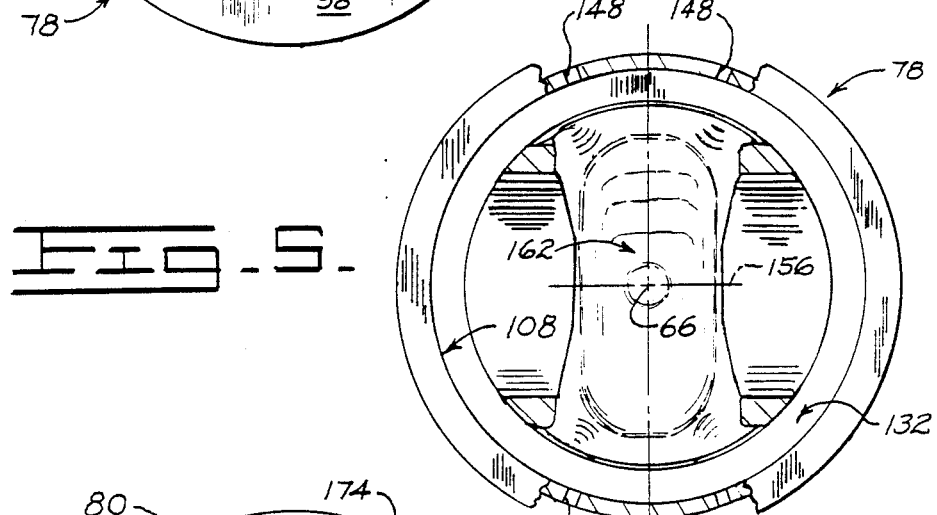
FIG. 5 is a cross sectional view solely of the piston member shown in FIG. 2 as taken along line V—V thereof.

The piston assembly 76 also includes a top split compression ring 138 of a keystone shape which is received in the top ring groove 112, an intermediate split compression ring 140 of a stepped rectangular cross section which is received in the intermediate ring groove 116, and an oil ring assembly 142 which is received in the bottom ring groove 120. The oil ring assembly includes an annular split ring 144 and a coiled expansion spring 146 which continuously urges the split ring outwardly against the piston or liner bore 54. The tubular wall 108 has a plurality of egress passages 148 therein which communicate the bottom ring groove 120 with the cooling recess 132, and the split ring 144 has an annular groove 150 facing the liner bore and a plurality of radial passages 152 therethrough so that oil can be wiped from the liner bore and return to the cooling recess for supplementary cooling purposes. In the instant embodiment, and as shown in FIG. 5, there are four passages 148 in the tubular wall 108 located primarily on or adjacent a transverse vertical plane 154 passing through the central axis 66, which plane is perpendicular to a longitudinal vertical plane 156 passing through the central axis 84 of the wrist pin 82.

As shown in FIGS. 1 and 2, the steel piston member 78 has a lower portion 158 including a pair of depending pin bosses 160 blendingly associated with the outwardly facing wall surface 128 of the upper portion 96, and blendingly associated also with a downwardly facing concave pocket 162 defined by the upper portion and centered on the axis 66. The concave pocket is spaced substantially uniformly away from the apex portion 102 of the crown surface 100 so as to define a crown 164 of generally uniform thickness C as is shown. Moreover, these views illustrate and define a relatively thin and substantially conically oriented web 166 of a generally uniform thickness W between the trough 106 and juxtaposed land portion 104 of the crown surface 100, and the outwardly facing wall surface 128. For example, in the embodiment illustrated, the thickness C was approximately 4 or 5 mm and the thickness W was approximately 5 to 7 mm. Each of the pin bosses 160 has a bore 168 therethrough, which bosses are adapted to individually receive a steel-backed bronze bearing sleeve 170 therein. These bearing sleeves are axially aligned to receive the wrist pin pivotally therethrough.

Figure 6:
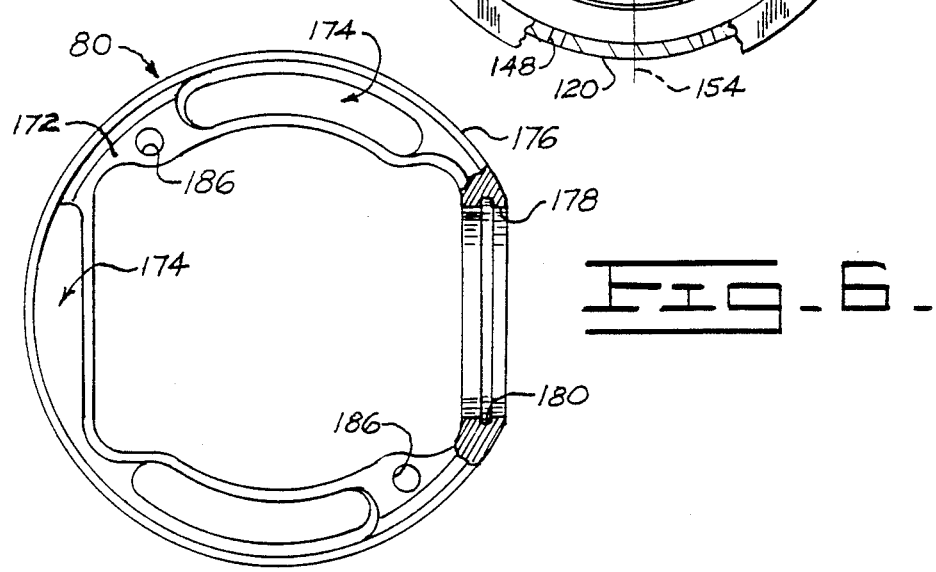
FIG. 6 is a top view solely of the piston skirt shown in FIG. 2 as taken along line VI—VI thereof.

Referring now to FIGS. 1, 2 and 6 and to the piston skirt 80, it has a top peripheral surface 172 with a fully annular, but contoured, upwardly facing oil trough 174 defined therein. It further has a slightly elliptical external surface 176 therearound which depends from the top surface, and with the major axis of the ellipse being oriented perpendicular to the pin axis 84. A pair of aligned wrist-pin-receiving bores 178 are formed through the piston skirt, and each of these bores has an annular groove 180 therein. The piston skirt is thus pivotally mounted on the wrist pin 82 which is insertably positioned in both bores. Excessive movement of the wrist pin is prevented along the axis 84 by a pair of split retaining rings 182 individually disposed in the grooves 180.

A pair of axially oriented bosses 184 are defined within the skirt 80 so that a corresponding pair of lubrication passages 186 can be provided fully axially therethrough. The lubrication passages are positioned diagonally opposite each other so that the skirt can be mounted on the wrist pin 82 in either of the two possible positions 180 degrees apart, so at least one of them will be axially aligned with the first jet nozzle 74. The skirt is also provided with diagonally opposite, semi-cylindrical recesses 188 which open downwardly at the bottom of the skirt to provide clearance from the nozzles when the skirt is reciprocated to its lowest elevational position.

INDUSTRIAL APPLICABILITY

In operation, the articulated piston assembly 76 reciprocates downwardly to bottom dead center whereupon the first nozzle 74 directs lubricating oil into the skirt passage 186 aligned therewith as can be noted by reference to FIG. 1. That oil jet continues upwardly beyond the top surface 172 whereupon it makes contact with the surfaces of the cooling recess 132 of the piston member 78 and is splashed peripherally in opposite directions. A significant portion of the oil is caught by the skirt trough 174 as the piston assembly is reciprocated upwardly and is furthermore evenly distributed around the interior of the piston member when it reverses direction at top dead center. Simultaneously, the second nozzle directs oil in a narrow column against the connecting rod 90 until the piston assembly is at bottom dead center whereupon that jet of oil passes above the eye end 92 and against the concave pocket 162 or underside of the crown 164.

Referring to FIG. 3, it may be noted that the top of the cooling recess 132 is in juxtaposed elevational relationship with the top of the ring groove 112. It is also elevationally disposed directly underneath the peripheral top surface 98 of the piston member 78, and within an elevational distance therefrom identified by the letter E. It has been concluded that the ratio of the distance E to the piston diameter D should be below about 0.10, and preferably should be between about 0.04 and 0.06. In one embodiment the diameter D was 124 mm, and the distance E was about 5.5 mm, which provides a ratio thereof of approximately 0.044.

In the same embodiment of the piston assembly 76 mentioned above the minimum elevational distance between the top surface 98 and the top ring groove 112, indicated by the letters TRH in FIG. 3, was 5 mm. The conclusion was reached that the ratio of the distance TRH to the diameter D should be below about 0.06, and preferably should be between about 0.035 and 0.05. In the referenced piston assembly that ratio was 0.04.

In the same embodiment the overall land height LH of the tubular wall 108 was 31 mm, and the elevational distance CH between the top surface 98 and the wrist pin axis 84 was 70 mm. Therefore, the ratio of LH to D was about 0.25, and the ratio of CH to D was about 0.56. It was subsequently concluded that for the articulated piston assembly 76 the ratio of LH to D should be above about 0.23, and preferably should be between 0.24 and 0.26; and the ratio of CH to D should be below about 0.60, and preferably should be between about 0.60 and 0.45.

The top of the cooling recess 132, the top of the top ring groove 112, and the top of the top block cooling recess 38 are thus substantially arranged in the same horizontal plane as may clearly be visualized by reference to FIG. 1. In marked contrast, prior art cylinder liners are typically supported by the block at the top thereof so that additional elevational space is required thereat and the top of any external water cooling recess about the liner must be lowered. The instant embodiment thus has maximum cooling and heat dissipation radially outwardly and radially inwardly from the steel piston member 78 immediately below the top surface 98. In addition, the top land crevice volume was reduced to approximately 978 mm³. Since the clearance volume, or total volume within the combustion chamber 107 with the piston assembly 76 at top dead center, was 114,530 mm³, this provided a ratio therebetween of approximately 0.009. The preferred ratio is below approximately 0.020, and this is a relatively low and desirable ratio.

In addition to the dimensional constraints mentioned above, it is to be appreciated that the articulated piston assembly 76 is preferably manufactured in a particular way and by using certain materials. Specifically, the upper steel piston member 78 is preferably forged from a chrome-moly alloy steel material such as a basically 4140 modified steel material. The lower aluminum piston skirt 80 is likewise preferably forged from an alloy aluminum material such as a basically SAE 321-T6 modified aluminum material.

The aforementioned alloy steel is particularly adaptable to Class II forging procedures, and can provide an austenitic grain size 5 or finer which is highly desirable to resist the high compression pressures above about 13,790 kPa (2,000 psi), and preferably above about 15,170 kPa (2,200 psi). Etched cross sectional samples of the forged steel piston member have indicated that the grain flow lines therein are generally or broadly oriented in an inverted U-shaped configuration that roughly approximates the shape of the piston member portion shown in FIG. 3 and/or roughly aligns the grain flow lines with the web 166 and the tubular wall 108, and this contributes substantially to the cross sectional strength thereof.

The aforementioned forged aluminum alloy has a high hardness, excellent wear resistance, and a relatively low coefficient of thermal expansion.

Other aspects, objects and advantages of this invention can be obtained from a study of the drawings, the disclosure and the appended claims.

We claim:

1. An engine of the type having a block defining an upper bore, a cylinder liner located in the block bore and defining a piston bore, a cylinder head connected to the block, and a piston assembly including a steel piston member disposed for reciprocation in the piston bore, wherein the improvement comprises:

the steel piston member having an upper portion of substantially cylindrical shape and a preselected diameter D, a peripheral top surface, a recessed crown surface, a tubular wall depending from the top surface and defining an outwardly facing top land, a top ring groove disposed a preselected minimal elevational distance TRH from the top surface and wherein the ratio TRH/D is less than 0.06, a lower end surface, and an annular inwardly facing wall surface extending upwardly from the lower end surface;

the upper portion further including an annular outwardly facing wall surface and a downwardly facing transition portion blendingly associated with the inwardly and outwardly facing wall surfaces to collectively define an annular downwardly facing cooling recess located in a juxtaposed elevational relationship with the top ring groove;

the piston member also having a lower portion including a pair of depending pin bosses blendingly associated with the cooling recess and individually defining a bore and with the bores being aligned on a common axis; and the engine including an annular recess defined between the cylinder liner and the block that is adapted in use to receive a liquid coolant, the annular recess being located in an elevationally aligned relationship with the top ring groove when the piston is at top dead center in order to dissipate heat away from the piston member thereat.

2. The engine of claim 1 wherein the block defines a generally cylindrical opening therethrough elevationally below and of smaller diameter than the upper bore and an annular seat therebetween, the cylinder liner being supported by the annular seat.

3. The engine of claim 2 wherein the block includes an upper block portion and a lower block portion releasably connected together, the upper block portion defining the annular recess in open communication wit the upper bore.

4. THe engine of claim 1 wherein the cooling recess in the piston member is located elevationally directly beneath the top surface, the cylinder liner has a central axis, and the recessed crown surface is defined by surfaces of revolution about the central axis for minimizing distortion of the piston member in use.

5. THe engine of claim 4 wherein a minimum volumetric region located directly above the crown surface and the top surface and below the cylinder head defines a combustion chamber having a preselected clearance volume, and another volumetric region above the top ring groove and below the top surface and between the cylinder liner and the piston member defines a crevice volume, and the crevice volume divided by the clearance volume is below about 0.020 for improved efficiency.

6. The engine of claim 1 wherein the distance TRH is approximately 5 mm.

7. The engine of claim 1 wherein the tubular wall has an overall land height LH divided by the diameter D of approximately 0.25.

8. The engine of claim 1 wherein the ratio TRH/D is preferably within a range of 0.035 to 0.05.

9. THe engine of claim 1 wherein the piston assembly includes an aluminum piston skirt defining a fully annular, upwardly facing trough, and a wrist pin connecting the piston member to the piston skirt such that the upwardly facing trough is disposed in a cooperating relationship with the downwardly facing cooling recess.

10. The engine of claim 9 wherein the piston member is constructed of a chrome-moly alloy steel material and is adaptable to withstand an operating pressure of above 13,790 kPa (2,000 psi).

* * * * *

REEXAMINATION CERTIFICATE (4098th)

United States Patent [19]
Weber et al.

[11] B1 4,941,440
[45] Certificate Issued Jun. 6, 2000

[54] ENGINE INCLUDING A PISTON MEMBER HAVING A HIGH TOP RING GROOVE

[75] Inventors: Robert L. Weber, Lacon; Kenneth R. Kamman, Edelstein; Benny Ballheimer; Stephen G. Shoup, both of Peoria, all of Ill.

[73] Assignee: Caterpillar Inc., Peoria, Ill.

Reexamination Request:
No. 90/005,235, Jan. 26, 1999

Reexamination Certificate for:
Patent No.: 4,941,440
Issued: Jul. 17, 1990
Appl. No.: 07/391,647
Filed: Aug. 7, 1989

Related U.S. Application Data

[63] Continuation of application No. 07/261,664, Oct. 21, 1988, abandoned.

[51] Int. Cl.$^7$ .................................................. F02F 3/00
[52] U.S. Cl. ................................... 123/193.6; 123/41.83
[58] Field of Search ............................. 123/41.83, 41.84, 123/193.6

[56] References Cited

U.S. PATENT DOCUMENTS

| | | | |
|---|---|---|---|
| 2,296,478 | 9/1942 | Morgan | 92/159 |
| 2,308,178 | 1/1943 | Kishline | 92/159 |
| 2,407,429 | 9/1946 | Kuttner | 92/158 |
| 2,720,193 | 10/1955 | Maybach | 123/41.36 |
| 3,463,057 | 8/1969 | Packard et al. | 92/233 |
| 3,465,651 | 9/1969 | Tromel | 92/220 |
| 3,476,021 | 11/1969 | Williams | 92/187 |
| 3,508,531 | 4/1970 | Squinto et al. | 123/193.6 |
| 3,971,355 | 7/1976 | Kottmann | 123/197 |
| 4,056,044 | 11/1977 | Kamman et al. | 92/159 |
| 4,083,292 | 4/1978 | Goloff | 92/176 |
| 4,129,108 | 12/1978 | Elsbett et al. | 123/193.6 |
| 4,161,165 | 7/1979 | Belush et al. | 123/193.6 |

(List continued on next page.)

FOREIGN PATENT DOCUMENTS

| | | |
|---|---|---|
| 0106935 | 5/1984 | European Pat. Off. . |
| 4793779 | 4/1979 | Japan . |
| 62-128143 | 8/1987 | Japan . |
| 1 603 534 | 4/1977 | United Kingdom . |

OTHER PUBLICATIONS

R. Munro, W.J. Griffiths, G.L. Allen, J. Travaille, A.E. Bolton, "Paper No. 6—Improved Piston Designs for Heavy Duty Diesel Applications," Partners in Progress, Technical Symposium 1986, Apr. 6–9, 1986, pp. 6.1–6.9.

R. Munro, R.A. Day, J.R. Parkin, "Paper No. 7—The Development of a Lightweight Steel Piston," Technical Symposium 1986, Apr. 6–9, 1986, pp. 7.1–7.5.

(List continued on next page.)

*Primary Examiner*—Weilun Lo

[57] ABSTRACT

Present day diesel engines having aluminum piston assemblies are limited to combustion chamber pressures of approximately 12,410 kPa (1,800 psi) whereas the desire is to increase such pressures up to the 15,170 kPa (2,200 psi) range. To reach such levels the instant engine has a piston assembly including a steel piston member having an upper cylindrical portion of a diameter D and defining a top surface, a depending tubular wall having a top ring groove a minimal elevational distance TRH below the top surface, and an annular cooling recess located beneath the top surface and juxtaposed to the top ring groove for removing heat away therefrom in use. The piston member is preferably forged and subsequently machined to precisely controllable dimensions, and has a ratio of TRH to D of less than 0.06. Moreover, the piston assembly is preferably of the articulated type and includes a forged aluminum piston skirt connected to the piston member through a common wrist pin. The skirt has an upwardly facing oil trough that is disposed in a cooperating relationship with the cooling recess of the piston member. A midsupported cylinder liner surrounds the piston assembly and a recess is provided thereabout at an elevation aligned with the top ring groove for maximizing cooling.

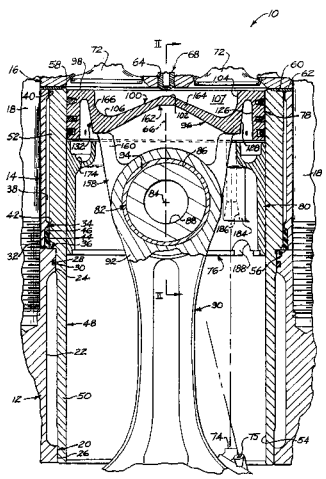

U.S. PATENT DOCUMENTS

| | | | |
|---|---|---|---|
| 4,180,027 | 12/1979 | Taylor | 123/41.35 |
| 4,207,808 | 6/1980 | Elsbett et al. | 92/158 |
| 4,270,494 | 6/1981 | Garter et al. | 123/193.6 |
| 4,286,505 | 9/1981 | Amdall | 92/186 |
| 4,377,967 | 3/1983 | Pelizzoni | 92/186 |
| 4,577,595 | 3/1986 | Deutschmann et al. | 123/41.35 |
| 4,581,983 | 4/1986 | Moebus | 92/186 |
| 4,593,660 | 6/1986 | Elsbett et al. | 123/193.6 |
| 4,638,769 | 1/1987 | Ballheimer | 123/41.83 |
| 4,644,853 | 2/1987 | Russell et al. | 92/190 |
| 4,662,047 | 5/1987 | Berchem | 29/156.5 R |
| 4,704,950 | 11/1987 | Ripberger et al. | 92/208 |
| 4,781,159 | 11/1988 | Elsbett et al. | 123/193.6 |
| 4,805,518 | 2/1989 | Heban, Jr. | 123/193.6 |

OTHER PUBLICATIONS

Information Disclosure Statement dated Sep. 19, 1991, In re Application of Bruce C. Cooper et al., U.S. Patent No. 4,867,119, Issued Sep. 19, 1989, For: Engine Piston Assembly and Forged Piston Member Thereffor Having a Cooling Recess.

Alan P. Gill, "Design Choices for 1990's Low Emission Diesel Engines," SAE Technical Paper Series, International Congress and Exposition, Feb. 29–Mar. 4, 1988, pp. 1–20.

Bruce Wadman, "New Small Engine Family Caterpillar," Jul. 1986 Diesel Progress North American.

Drawing P–1678 AR/XO dated Aug. 24, 1985.

Report No. 216,041 dated Jan. 2, 1985.

Apr. 1984 Proposal.

Technical Paper; Mahle Symposium (pp. 3; 77–89), dated May 1973, by H.G. Braendel.

Technical Paper; Associated Engrg. Group Technical Symposium, Paper No. 7 Title: "Oil Cooled & Electron Beam Welded Pistons for Diesel Engs.," dated 1978, by Dr. R. Monro et al.

Technical Paper No. 780781; Society of Automotive Engineers, dated Sep. 11–14, 1978, by M.D. Roehrle.

Technical Paper No. 770031; Society of Automotive Engineers, dated Feb. 28–Mar. 4, 1977, by M.D. Roehrle.

Application filed simultaneously herewith by: Bruce C. Cooper et al. for: Engine Piston Assembly and Piston Member Therefor Having a Cooling Recess, now issued as U.S. Patent No. 4,867,119, and then reissued as U.S. Patent Re. 34,139 on Dec. 1992.

Application filed simultaneously herewith by: B. Ballheimer et al. for: Piston Assembly and Piston Member Thereof Having a Predetermined Compression Height to Diameter Ratio, now issued as U.S. Patent. No. 5,040,454 on Aug. 1991.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *